United States Patent Office 3,490,786
Patented Jan. 20, 1970

3,490,786
VARIABLE ACTION ANTI-ROLL MECHANISM FOR SUSPENSION SYSTEMS OF VEHICLES
Raymond A. Ravenel, Sceaux, France, assignor to Societe Anonyme Andre Citroen, Paris, France
Filed Feb. 14, 1968, Ser. No. 705,409
Claims priority, application France, Mar. 22, 1967, 99,774
Int. Cl. B60g 11/18, 17/00
U.S. Cl. 280—124                                     5 Claims

ABSTRACT OF THE DISCLOSURE

The two wheels of an axle are carried by two arms of which the one is rigidly connected to one end of a torsion bar and the other is rotatably mounted on the opposite end of said torsion bar rigid with a lever. Disposed between this lever and the other arm is a connection of which the variable action is adjustable by changing the angular position of a control cam.

FIELD OF THE INVENTION

Suspension systems of vehicles are already known which have a flexibility variable as a function of the vehicle load, for the purpose of obtaining a regular or at least moderately variable oscillation frequency.

In the case of trucks and other heavy vehicles a two-flexibility suspension is frequently provided by using twin leaf springs mounted in parallel.

In the case of a vehicle equipped with an anti-roll device it is also advantageous that the flexibility of this device be variable as a function of load.

DESCRIPTION OF THE PRIOR ART

Various forms of embodiment of this variable flexibility feature are already known in the case of automotive vehicles equipped with a torsion bar anti-roll system. They consist in modifying the length of the stabilizing bar either by causing its translation between bearings at different spacings, or by causing the translation of the bearing along the bar.

These known devices are objectionable in that the torsion bar is subjected to a combined flexion and torsion strain, with scarcely accurate results. Moreover, the means for controlling the sliding movements of the bars or bearings which are necessary for altering the elasticity of the torsion bar, are relatively complicate to construction and operate.

SUMMARY OF THE INVENTION

It is the object of the present invention to provide a variable action anti-roll device for suspension systems of vehicles, which is constructionally simple, easy to control and reliable in operation, notably in the case of an arrangement automatically responsive to the vehicle load.

In this mechanism comprising essentially a torsion bar mounted transversely in bearings of the vehicle frame and an arm connected to a wheel and rigidly attached to one end of said bar, the arm connected to the other wheel, which is mounted for free rotational movement about the opposite end of the bar, is controlled angularly by a lever rigid with said opposite end of the bar, the head of said lever being connected to said arm through the medium of an angularly adjustable cam device.

The cam is adapted to control the degree of opening of a clip or pliers having their arms pivotally mounted on the same end of the torsion bar and their jaws adapted to clamp said other wheel arm by means of interposed resilient pads.

This cam may also be engaged in a recess formed in the same arm so as to be placed angularly therein either in a release position in which the torsion bar is inoperative or in a coupling position causing said wheel arm to become rigid with the torsion bar.

BRIEF DESCRIPTION OF THE DRAWING

The features and advantages of this invention will appear more completely from the following description given with reference to the accompanying drawing illustrating diagrammatically by way of example typical forms of embodiment of the device of this invention.

In the drawing.

DESCRIPTION OF THE PREFERRED EMBODIMENT

Figure 1:
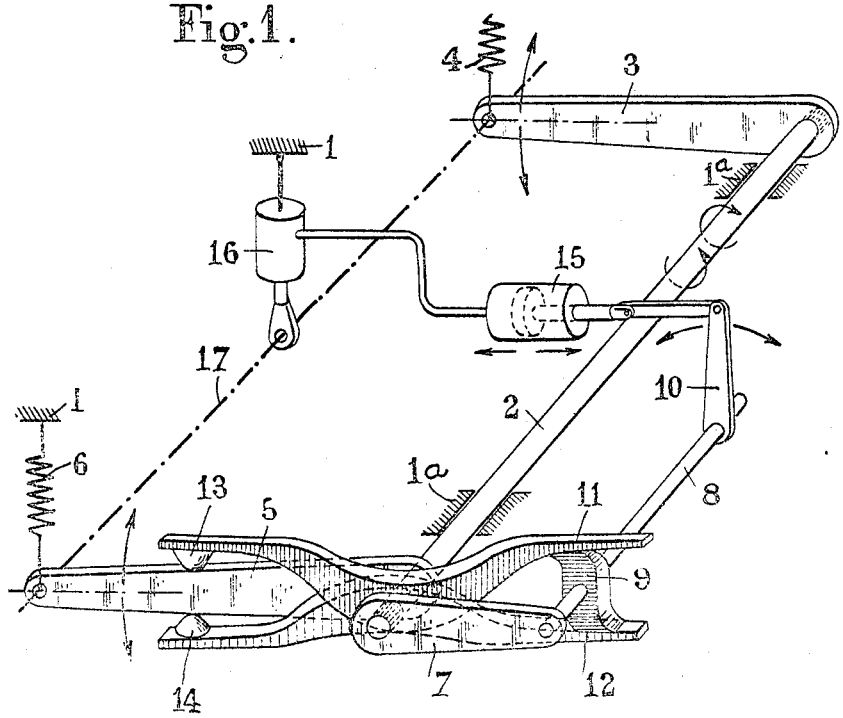
FIGURE 1 is a perspective view showing a mechanism providing an anti-roll connection, which is provided with means for adjusting the elasticity thereof.

The device illustrated in FIGURE 1 comprises a torsion bar 2 mounted for transverse rotation in bearings 1a carried by the frame structure of the vehicle. The torsion bar 2 has rigidly secured thereto an arm 3 connected to a wheel (not shown), on which one point of the frame 1 is adapted to bear through the medium of an elastic suspension element 4. The opposite end of the torsion bar 2 extends freely through another wheel arm 5 similar to arm 3 and connected to the other wheel on which the frame 1 of the vehicle is caused to bear through another elastic suspension element 6. Wedged or keyed to this last-named end of torsion bar 2 is a lever 7 rotatably supporting a rod 8 having wedged thereon an S-shaped cam 9 and a control arm 10. On the same end of torsion bar 2 and between the arm wheel 5 and lever 7 are pivotally mounted two arms 11 and 12, disposed on either side of cam 9, of pliers having their jaws provided with pads 13 and 14 of suitable elastomer, said pads being disposed on either side of said wheel arm 5, as shown. The cam 9 is adapted to move the two arms 11 and 12 of the pliers away from each other, so that the pads 13 and 14 will resiliently clamp the arm 5 with a flexibility adjustable by varying the angular position of the control arm 10. The wheel arm 5 is thus rigid with lever 7 during its pivoting movements about the torsion bar 2 through the medium of a resilient reaction torque the strength of which is responsive to the angular position of control lever 10. The resilient reaction torque resisting the angular difference between the arms 3 and 5 connected to the two wheels is thus the sum of the fixed-elasticity torque corresponding to the torsion of bar 2 and the adjustable-elasticity torque produced by the more or less compressed pads 13 and 14.

The control lever 10 adjusting the elasticity of the coupling between the two wheels may be actuated according to the desired purpose. More particularly, this elasticity may be adjusted in a manner automatically responsive to the vehicle load by causing this control lever to be actuated by a piston movable against the resistance of a coil compression spring in a cylinder 15 communicating with a hydraulic cell 16 responsive to this end to the load applied between the spring portion 1 and the unsprung portion 17 of the vehicle.

Figure 2:
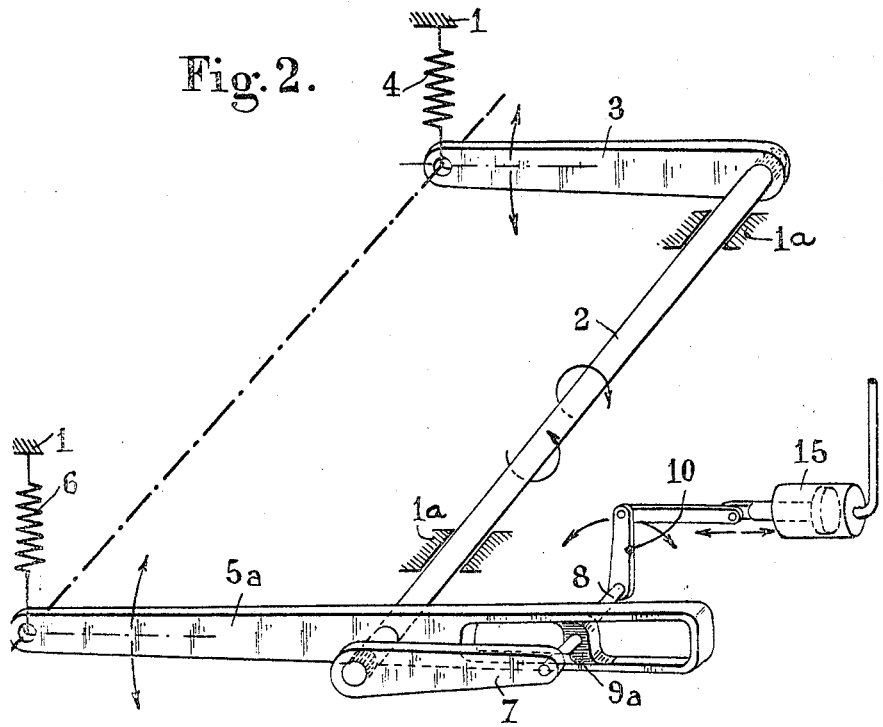
FIGURE 2 is a similar view showing a mechanism permitting the engagement or disengagement of an anti-roll coupling for a predetermined load value.

In the device illustrated in FIGURE 2, the same elements as those denoted by the reference numerals 1 to 10 inclusive of FIGURE 1 are also found, with the difference that the S-shaped cam 9a, instead of being engaged between the two arms of pliers or like members, is engaged between the two edges of a cavity formed in the arm 5a. Thus, if the control lever 10 is actuated in the direction to free said cam 9a, both arms 3 and 5a can move freely in relation to each other and the torsion bar 2 is inoperative. By turning the control lever 10 in the direction to cause the cam 9a to engage the edges of the recess in arm 5a, this arm 5a becomes rigid with the cylindrical rod 8, and therefore with the lever 7 and torsion bar 2. Then a resilient coupling is established by the torsion bar between the two arms 3 and 5a. As in the preceding form of embodiment, the control lever 10 may be actuated by means of a hydraulic cylinder or actuator 15, but in this case this device becomes operative only when the pressure exceeds a predetermined value.

The simplified device illustrated in FIGURE 2 may be used in a vehicle already equipped with a permanent stabilizing device; in this case it has a complementary function.

However, this device is particularly valuable in the case of heavy vehicles such as trucks and the like in which the suspension system is generally sufficient for controlling rolling movements under zero-load or moderate load conditions, the stabilizing action becomes effective only beyond a predetermined load threshold.

What I claim is:

1. A variable-action anti-roll mechanism for two wheels suspended under the frame structure of a vehicle, which comprises a torsion bar mounted for transverse rotation under said frame structure, a first wheel arm rigidly secured to one end of said torsion bar and connected to the one of said wheels, another wheel arm rotatably mounted on the opposite end of said bar and connected to the other wheel, a lever rigidly secured to said opposite end of the bar, a rod rotatably carried by said lever parallel to said torsion bar, means for controlling the angular setting of said rod, a cam rotatably solid with said rod, and means including said cam and said rod connecting said other wheel arm to said lever, said connecting means being responsive to the angular setting of said cam.

2. A mechanism as set forth in claim 1, wherein the means controlling the angular setting of said rod are responsive to the action of compressed hydraulic fluid.

3. A mechanism as set forth in claim 2, wherein the compressed hydraulic fluid is provided by a load-responsive hydraulic cell interposed between the unsprung and the sprung portion of the vehicle.

4. A mechanism as set forth in claim 1, wherein the means connecting said other wheel arm to said lever comprises in part two arms of a plier shaped means, said last mentioned arms being rotatably mounted on said other end of the torsion bar, said last mentioned arms having on the one hand registering front ends provided with resilient pads adapted to clamp said other arm between them, and on the other hand rear ends of which the relative spacing determines the resilient clamping force exerted by said pads on said other arm, said cam being disposed in the space between said rear ends of said last mentioned arms.

5. A mechanism as set forth in claim 1, wherein the means connecting said other arm to said lever consist of an extension of said other arm which extends to the rear of said torsion bar, said extension having a recess formed therein, said cam being disposed in said recess whereby said recess is engaged by said cam either with play or with a tightness causing said lever to become rigid with said other arm, according to the angular position of said cam.

References Cited

UNITED STATES PATENTS 3,085,817  4/1963  Krause et al. _____ 280—124

FOREIGN PATENTS 1,052,389  9/1953  France.

A. HARRY LEVY, Primary Examiner

U.S. Cl. X.R.

267—11, 57